(12) United States Patent
Hirano et al.

(10) Patent No.: US 12,085,463 B2
(45) Date of Patent: Sep. 10, 2024

(54) VACUUM INSULATOR AND SYSTEM FOR TESTING THE SAME

(71) Applicant: Panasonic Intellectual Property Management Co., Ltd., Osaka (JP)

(72) Inventors: Toshiaki Hirano, Shiga (JP); Kenichi Kakita, Shiga (JP); Hideji Kawarazaki, Osaka (JP); Masafumi Okawa, Osaka (JP); Shinya Kojima, Kyoto (JP); Masahiro Kagimoto, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 653 days.

(21) Appl. No.: 17/282,889

(22) PCT Filed: Jul. 29, 2020

(86) PCT No.: PCT/JP2020/029057
§ 371 (c)(1),
(2) Date: Apr. 5, 2021

(87) PCT Pub. No.: WO2021/171648
PCT Pub. Date: Sep. 2, 2021

(65) Prior Publication Data
US 2022/0146353 A1  May 12, 2022

(30) Foreign Application Priority Data

Feb. 28, 2020 (JP) .................................. 2020-033361

(51) Int. Cl.
*G01L 11/00* (2006.01)
*B65D 81/38* (2006.01)
(Continued)

(52) U.S. Cl.
CPC ............ *G01L 11/002* (2013.01); *B65D 81/38* (2013.01); *G01N 25/18* (2013.01); *H04Q 9/00* (2013.01);
(Continued)

(58) Field of Classification Search
CPC ....... G01L 11/002; G01L 21/14; G01N 25/18; H04Q 9/00; H04Q 2209/886;
(Continued)

(56) References Cited

U.S. PATENT DOCUMENTS

2003/0167789 A1 9/2003 Tanimoto et al.
2007/0095713 A1 5/2007 Schooley
(Continued)

FOREIGN PATENT DOCUMENTS

CN 206573897 U 10/2017
CN 108861111 A 11/2018
(Continued)

OTHER PUBLICATIONS

The extended European search report of European Patent Application No. 20921421.2, Sep. 12, 2023, 10 pages.
(Continued)

*Primary Examiner* — Jonathan M Dunlap
(74) *Attorney, Agent, or Firm* — HSML P.C.

(57) ABSTRACT

A vacuum insulator (10) includes: a core (13); a pressure sensor (51) that detects a pressure; a transmitter (52) that transmits, by wireless communication, the detected pressure detected by the pressure sensor (51); a power feeder (53) that feeds electric power to the pressure sensor (51) and the transmitter (52); and an outer skin (14), an inside of which is decompressed, the outer skin (14) accommodating therein the core (13), the pressure sensor (51), the transmitter (52), and the power feeder (53), the outer skin (14) having gas barrier capability.

14 Claims, 9 Drawing Sheets

(51) Int. Cl.
*G01N 25/18* (2006.01)
*H04Q 9/00* (2006.01)

(52) U.S. Cl.
CPC ... *B65D 81/3813* (2013.01); *H04Q 2209/886* (2013.01)

(58) Field of Classification Search
CPC ........... H04Q 2209/40; H04Q 2209/43; B65D 81/18; B65D 81/2015; B65D 81/3818; B65D 81/02; B65D 81/266; B65D 81/3816; B65D 81/3823; B65D 81/3841; B65D 81/24; B65D 81/3834; B65D 25/02; B65D 25/108; B65D 25/20; B65D 25/2808; B65D 51/24; B65D 79/02; B65D 43/00; B65D 43/163; B65D 2543/00194; B65D 2565/387; B65D 65/38; B65D 77/0453; F16L 59/065; G08C 17/00; G08C 17/02; G01K 1/024; G01K 1/14; G01K 7/00; G01K 13/10; G01K 15/00; F25D 2201/14; F25D 23/06; F25D 11/003; F25D 2303/0843; F25D 2303/0844; F25D 2303/0845; F25D 2700/00; F25D 2700/12; F25D 29/003; F25D 29/005; F25D 3/06; F25D 3/08
See application file for complete search history.

(56) References Cited

U.S. PATENT DOCUMENTS

| | | | |
|---|---|---|---|
| 2012/0211974 A1 | 8/2012 | Richardson | |
| 2012/0229261 A1* | 9/2012 | Lee ..................... | G08C 17/02 340/10.5 |
| 2013/0201032 A1* | 8/2013 | Hewitt .................. | G01M 3/40 340/870.02 |
| 2017/0089496 A1 | 3/2017 | Lennon | |
| 2017/0320054 A1* | 11/2017 | Crum .................... | B01L 9/06 |
| 2018/0252464 A1 | 9/2018 | Hirano et al. | |
| 2019/0013703 A1 | 1/2019 | Shichino | |
| 2020/0049586 A1 | 2/2020 | Eschenbach et al. | |
| 2020/0052369 A1 | 2/2020 | Kilmer et al. | |

FOREIGN PATENT DOCUMENTS

| | | | | |
|---|---|---|---|---|
| CN | 110217496 A | | 9/2019 | |
| EP | 3693649 | | 8/2020 | |
| EP | 3798554 A1 | * | 3/2021 | ............. F25D 11/02 |
| GB | b65d | * | 7/2020 | ............. B65D 25/04 |
| JP | 10-239199 | | 9/1998 | |
| JP | 2006-118559 | | 5/2006 | |
| JP | 2007-126188 | | 5/2007 | |
| JP | 2010-261501 | | 11/2010 | |
| JP | 2012-051608 | | 3/2012 | |
| JP | 2012-051647 | | 3/2012 | |
| JP | 2012136254 A | * | 7/2012 | ............. F16L 59/065 |
| JP | 2012-171733 | | 9/2012 | |
| JP | 2013-088036 | | 5/2013 | |
| JP | 2015-096740 | | 5/2015 | |
| JP | 2015-169372 | | 9/2015 | |
| JP | 2017-184383 | | 10/2017 | |
| JP | 2018-100712 | | 6/2018 | |
| JP | 2018-128816 | | 8/2018 | |
| JP | 2018-537638 | | 12/2018 | |
| JP | 2019065995 A | * | 4/2019 | ............. F16L 59/065 |
| WO | 01/081818 | | 11/2001 | |
| WO | 2012/017903 | | 2/2012 | |
| WO | 2017/090240 | | 6/2017 | |
| WO | WO-2017167697 A1 | * | 10/2017 | ............. F25D 11/003 |
| WO | 2018/158323 | | 9/2018 | |
| WO | 2019/069531 | | 4/2019 | |
| WO | WO-2020255887 A1 | * | 12/2020 | ............. B65D 25/108 |
| WO | WO-2022201611 A1 | * | 9/2022 | |
| WO | WO-2023042495 A1 | * | 3/2023 | |

OTHER PUBLICATIONS

International Search Report and Written Opinion of PCT/JP2020/029057, Sep. 29, 2020, 10 pages.

\* cited by examiner

VACUUM INSULATOR AND SYSTEM FOR TESTING THE SAME

TECHNICAL FIELD

The present disclosure relates to a vacuum insulator and a system for testing the same.

BACKGROUND ART

As a conventional vacuum insulator application, a thermally insulated container disclosed in Patent Literature 1 is known. The thermally insulated container includes a container and a thermally insulated bag. The bag accommodates the container therein. The bag has double walls. A vacuum insulation material is accommodated between the double walls.

CITATION LIST

Patent Literature

PTL 1: Japanese Laid-Open Patent Application Publication No. 2007-126188

SUMMARY OF INVENTION

Technical Problem

For example, the transportation of pharmaceuticals or the like requires strict temperature control to keep them at low temperatures for a predetermined period of time regardless of the outdoor temperature. In this respect, there are cases where the degree of vacuum of the aforementioned vacuum insulation material is lowered due to external force applied thereto, aging degradation thereof, etc., consequently causing deterioration in the thermal insulation performance of the vacuum insulation material. Therefore, it is important to test the thermal insulation performance of the vacuum insulation material.

However, if testing equipment such as a heat flux sensor and a temperature sensor are used for testing the thermal insulation performance, since it is necessary to bring the testing equipment into contact with the vacuum insulation material, there is a risk of damaging the vacuum insulation material. Also, the measurement of the amount of heat, temperature, or the like by the testing equipment is time-consuming, and thereby the testing time for testing the thermal insulation performance becomes lengthy.

The present disclosure has been made in order to solve the above-described problems. An object of the present disclosure is to provide a vacuum insulator and a system for testing the same that make it possible to test thermal insulation performance safely within a short period of time.

Solution to Problem

A vacuum insulator according to a first aspect of the present invention includes: a core; a pressure sensor that detects a pressure; a transmitter that transmits, by wireless communication, the detected pressure detected by the pressure sensor; a power feeder that feeds electric power to the pressure sensor and the transmitter; and an outer skin, an inside of which is decompressed, the outer skin accommodating therein the core, the pressure sensor, the transmitter, and the power feeder, the outer skin having gas barrier capability.

According to the above configuration, the pressure inside the outer skin is detected by the pressure sensor, and the detected pressure is transmitted by the transmitter by wireless communication. The pressure can be detected within a short period of time, and the detected pressure can be obtained without contacting the outer skin. Therefore, the thermal insulation performance of the vacuum insulator can be safely tested within a short period of time based on the detected pressure.

A vacuum insulator according to a second aspect of the present invention may be configured such that, in the above first aspect, the transmitter transmits the detected pressure by NFC (Near Field Communication). According to this configuration, a receiver can receive the detected pressure from the transmitter without paring, and based on the detected pressure, the thermal insulation performance of the vacuum insulator can be tested within a short period of time.

A vacuum insulator according to a third aspect of the present invention may be configured such that, in the above first aspect, the transmitter transmits the detected pressure by BLE (Bluetooth (registered trademark) low energy) communication. According to this configuration, the receiver can receive the detected pressure from the transmitter even if the transmitter is disposed at a distant position, and thus the degree of freedom in terms of the installation position of the receiver is increased.

A vacuum insulator according to a fourth aspect of the present invention may be configured such that, in any one of the above first to third aspects, the power feeder includes a power receiving coil that receives electric power in a non-contact manner from a power transmitting coil that is positioned outside the outer skin. According to this configuration, no battery is used in the power feeder, and this makes it possible to prevent a situation where the test cannot be performed due to power shortage and a situation where battery leakage causes lowering of the degree of vacuum of the vacuum insulator.

A vacuum insulator according to a fifth aspect of the present invention may be configured such that, in the above fourth aspect, the power receiving coil receives the electric power by a magnetic resonance technique. According to this configuration, the power receiving coil can receive the electric power from the power transmitting coil even if the power transmitting coil is disposed at a distant position. Even if the vacuum insulator is covered by, for example, a protective layer having a great thickness, the thermal insulation performance of the vacuum insulator can be tested without removing the protective layer from the vacuum insulator.

A vacuum insulator according to a sixth aspect of the present invention may be configured such that, in the above fourth aspect, the power receiving coil receives the electric power by an electromagnetic induction technique. According to this configuration, the power feeder can be made compact, which makes it possible to reduce thermal insulation performance deterioration caused by the power feeder while avoiding increase in the size of the vacuum insulator.

A vacuum insulator according to a seventh aspect of the present invention may be configured such that, in any one of the above first to third aspects, the power feeder includes a battery that stores the electric power. According to this configuration, the power feeder can be made compact, which makes it possible to reduce thermal insulation performance deterioration caused by the power feeder while avoiding increase in the size of the vacuum insulator.

A testing system for testing a vacuum insulator according to an eighth aspect of the present invention may include: the vacuum insulator according to any one of the above first to sixth aspects; and a tester including a power transmitter and a receiver, the power transmitter transmitting the electric power to the power feeder, the receiver receiving the detected pressure transmitted from the transmitter. According to this configuration, the thermal insulation performance of the vacuum insulator can be tested safely within a short period of time.

A testing system for testing a vacuum insulator according to a ninth aspect of the present invention may include: the vacuum insulator according to the above seventh aspect; and a tester including a receiver that receives the detected pressure transmitted from the transmitter. According to this configuration, the thermal insulation performance of the vacuum insulator can be tested safely within a short period of time.

Advantageous Effects of Invention

The present disclosure provides, in relation to a vacuum insulator and a testing system for testing the vacuum insulator, an advantageous effect of being able to test thermal insulation performance safely within a short period of time.

The above object, other objects, features, and advantages of the present disclosure will be made clear by the following detailed description of preferred embodiments with reference to the accompanying drawings.

DESCRIPTION OF EMBODIMENTS

Figure 1:
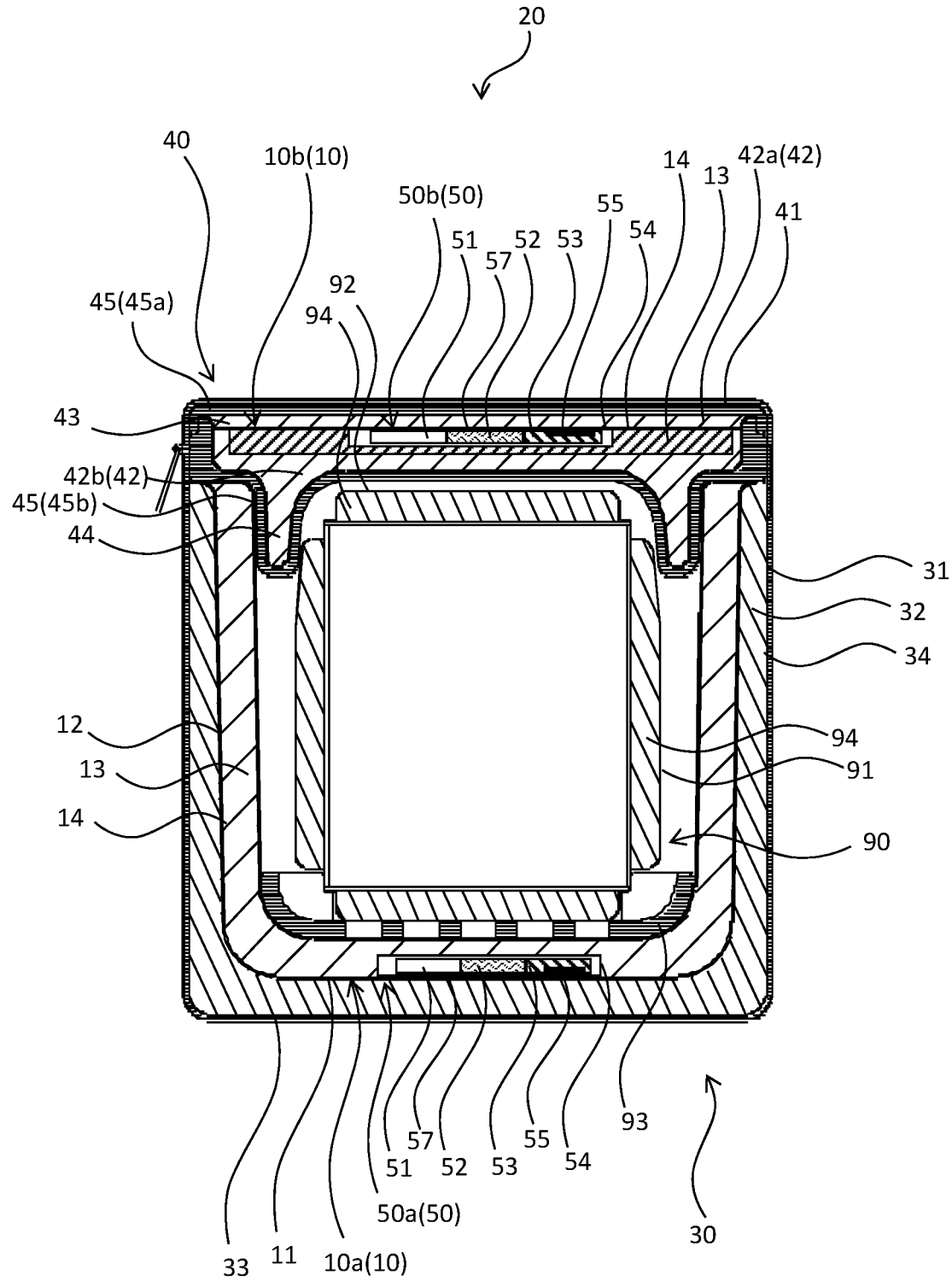
FIG. 1 is a sectional view schematically showing a heat retention box including vacuum insulators according to Embodiment 1 of the present disclosure.

Hereinafter, embodiments of the present disclosure are specifically described with reference to the drawings. In the drawings, the same or corresponding elements are denoted by the same reference signs, and repeating the same descriptions is avoided below.

Embodiment 1

<Configuration of Heat Retention Box>

Figure 2:
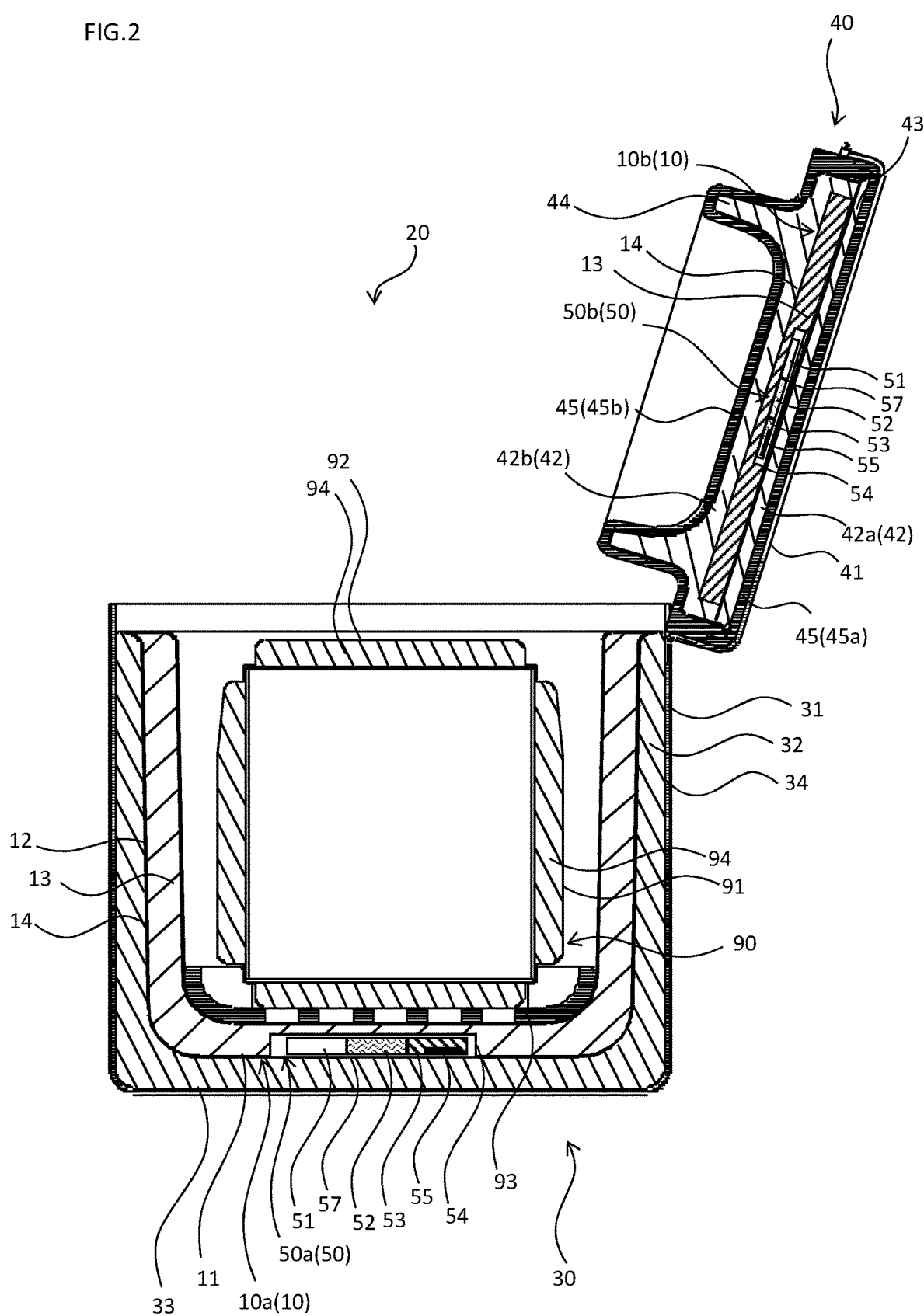
FIG. 2 is a sectional view schematically showing the heat retention box whose heat retention lid shown in FIG. 1 is opened.

As shown in FIG. 1 and FIG. 2, a vacuum insulator 10 according to Embodiment 1 is used in, for example, a heat retention box 20, which is intended for transporting or storing articles such as pharmaceuticals, samples, or food products. Hereinafter, a case where the vacuum insulator 10 is used in the heat retention box 20 is described. However, the use application of the vacuum insulator 10 is not limited thereto.

The heat retention box 20 includes a heat retention container 30 and a heat retention lid 40. The heat retention container 30 includes a first exterior member 31, a first protective layer 32, and a first vacuum insulator 10a. The heat retention lid 40 includes a second exterior member 41, a coating layer 45, a second protective layer 42, and a second vacuum insulator 10b. It should be noted that, in the description below, each of the first vacuum insulator 10a and the second vacuum insulator 10b may be simply referred to as the vacuum insulator 10. The vacuum insulator 10 will be described below in detail.

The first protective layer 32 is disposed inside the first exterior member 31. The first vacuum insulator 10a is disposed inside the first protective layer 32. The first vacuum insulator 10a includes an interior space that is disposed inside the first vacuum insulator 10a. An opening of the interior space is covered by the heat retention lid 40, and thereby the heat retention box 20 is closed. A part of the heat retention box 20, the part being positioned on the interior space (of the first vacuum insulator 10a) side with respect to the first exterior member 31, is referred to as the inner side, and the other side with respect to the first exterior member 31 is referred to as the outer side. In a state where the opening of the heat retention container 30 is sealed by the heat retention lid 40, a part of the heat retention box 20, the part being positioned on the heat retention container 30 side with respect to the heat retention lid 40, is referred to as the lower side, and the other side with respect to the heat retention lid 40 is referred to as the upper side. However, the arrangement of the heat retention box 20 is not thus limited.

The first exterior member 31 of the heat retention container 30 is in the shape of a box whose upper end is open. For example, the first exterior member 31 is formed of a material such as a synthetic fiber fabric, plastic, or cardboard. The first exterior member 31 accommodates the first protective layer 32 therein, and covers the outer surface of the first protective layer 32. It should be noted that a belt handle or the like may be attached to the first exterior member 31 so that a user can easily hold the heat retention box 20.

The first protective layer 32 is, for example, in the shape of a box whose upper end is open. For example, the first protective layer 32 is formed of a cushioning material such as styrene foam. The first protective layer 32 accommodates the first vacuum insulator 10a therein, and covers the outer surface of the first vacuum insulator 10a, thereby preventing the first vacuum insulator 10a and a stored article from getting damaged due to, for example, an impact shock and vibration applied from the outside.

The first protective layer 32 includes a first lower wall 33 and four first side walls 34. Each of these walls has a rectangular flat plate shape. The first lower wall 33 is disposed at the lower end of the first protective layer 32. The four first side walls 34 rise upward from respective outer peripheral edges of the first lower wall 33. The first side walls 34 adjacent to each other are connected to each other.

Thus, the first protective layer 32 has a square tubular shape, with its lower end opening sealed by the first side wall 34.

The first vacuum insulator 10a is in the shape of a box whose upper end is open. The first vacuum insulator 10a includes a second lower wall 11 and four second side walls 12. Each of the second lower wall 11 and the second side walls 12 has a rectangular flat plate shape. The second lower wall 11 is disposed at the lower end of the first vacuum insulator 10a. For example, the four second side walls 12 rise upward from respective outer peripheral edges of the second lower wall 11. The second side walls 12 adjacent to each other are connected to each other. Thus, the first vacuum insulator 10a has a square tubular shape, with its lower end opening sealed by the second lower wall 11.

As described above, the outer surface of the heat retention container 30 is formed by the first exterior member 31; the inner surface of the heat retention container 30 is formed by the first vacuum insulator 10a; and the upper end opening of the heat retention container 30 corresponds to the upper end opening of the first vacuum insulator 10a. The interior space of the heat retention container 30 corresponds to the interior space of the first vacuum insulator 10a. The interior space has a rectangular parallelepiped shape surrounded by the second lower wall 11 and the four second side walls 12, and communicates with the outside through the upper end opening.

The heat retention lid 40 includes an upper lid part 43 and a lower lid part 44. The upper lid part 43 has a rectangular flat plate shape. The lower lid part 44 includes a flat plate portion and a protruding portion. The flat plate portion has a rectangular flat plate shape. The protruding portion protrudes from the lower surface of the flat plate portion. The flat plate portion of the lower lid part 44 has a lower surface and an upper surface. The lower surface faces the upper end opening of the heat retention container 30. The upper surface is positioned on the opposite side of the flat plate portion from the lower surface. The upper surface of the lower lid part 44 faces and is in contact with the lower surface of the upper lid part 43, and thus the heat retention lid 40 is formed.

As shown in FIG. 1, in a state where the upper end opening of the heat retention container 30 is sealed by the heat retention lid 40, the lower surface of the lower lid part 44 is in contact with the upper end of the first protective layer 32 and the upper end of the first vacuum insulator 10a. Also, in this state, the protruding portion of the lower lid part 44 fits inside the first vacuum insulator 10a, and the outer peripheral surface of the lower lid part 44 is either in contact with the inner surface of the first vacuum insulator 10a or adjacent to the inner surface of the first vacuum insulator 10a, with a gap formed therebetween.

Of the heat retention lid 40 thus configured, the upper lid part 43 is formed by the second exterior member 41, an upper portion 45a of the coating layer 45, and an upper portion 42a of the second protective layer 42, whereas the lower lid part 44 is formed by a lower portion 45b of the coating layer 45, a lower portion 42b of the second protective layer 42, and the second vacuum insulator 10b.

The second exterior member 41 is formed of, for example, a material such as a synthetic fiber fabric, plastic, or cardboard. The second protective layer 42 is formed of a cushioning material such as styrene foam. As with the first protective layer 32 and the second protective layer 42, the coating layer 45 may be formed of a cushioning material such as styrene foam. Alternatively, in order to increase the sealability of the upper end opening of the heat retention container 30, the coating layer 45 may be formed of a cushioning material such as soft urethane foam.

It should be noted that the upper portion 45a of the coating layer 45 and the upper portion 42a of the second protective layer 42 may be integrated together if both the upper portion 45a and the upper portion 42a are formed of the same material, such as styrene foam. Similarly, the lower portion 45b of the coating layer 45 and the lower portion 42b of the second protective layer 42 may be integrated together if both the lower portion 45b and the lower portion 42b are formed of the same material, such as styrene foam.

The upper surface and the side surfaces of the upper portion 42a are covered by the upper portion 45a, and the upper portion 45a is covered by the second exterior member 41. Accordingly, the upper surface and the side surfaces of the upper lid part 43 are constituted by the second exterior member 41, and the lower surface of the upper lid part 43 is constituted by the upper portion 42a. The surfaces of the lower portion 42b, except the upper surface, are covered by the lower portion 45b. Accordingly, the lower surface and the side surfaces of the flat plate portion of the lower lid part 44, and the protruding portion of the lower lid part 44, are constituted by the lower portion 45b, and the upper surface of the lower lid part 44 is constituted by the lower portion 42b.

The lower portion 42b is provided with a recess that is recessed from its upper surface, and the second vacuum insulator 10b is accommodated in the recess. The upper surface of the second vacuum insulator 10b and the upper surface of the lower portion 42b are flush with each other. When the upper surface of the second vacuum insulator 10b and the upper surface of the lower portion 42b are covered by the upper portion 42a, the upper lid part 43 and the lower lid part 44 are connected to each other, and thereby the heat retention lid 40 is formed. As a result, the second protective layer 42, which is formed by the upper portion 42a and the lower portion 42b, is accommodated inside the coating layer 45, which is formed by the upper portion 45a and the lower portion 45b, and the second vacuum insulator 10b is disposed inside the second protective layer 42. The upper surface and the side surfaces of the heat retention lid 40 are constituted by the second exterior member 41, and the lower surface and the protruding portion of the heat retention lid 40 are constituted by the coating layer 45. The second vacuum insulator 10b is disposed in the heat retention lid 40, and covered by the second protective layer 42. It should be noted that the second exterior member 41 may be connected to the upper end of the first exterior member 31 in such a manner that the upper end opening of the heat retention container 30 is openable and closeable by the heat retention lid 40.

<Configuration of Vacuum Insulator>

Figure 3:
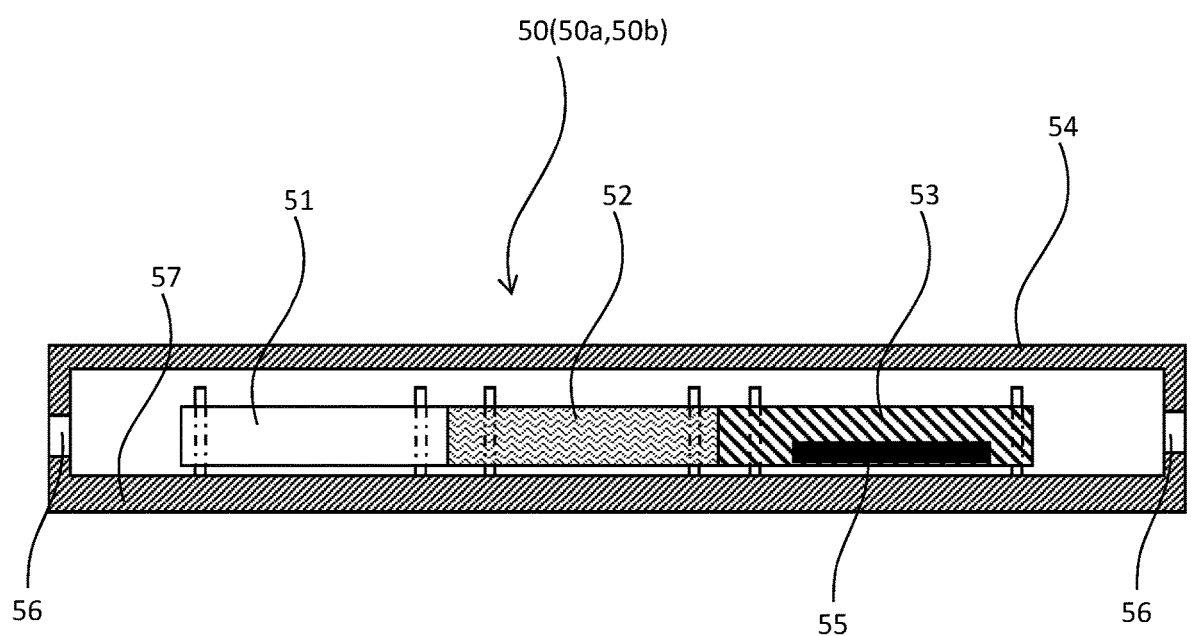
FIG. 3 is a sectional view schematically showing a wireless vacuum gauge device shown in FIG. 1.

As shown in FIG. 1 and FIG. 3, the vacuum insulator 10 includes a core 13, an outer skin 14, and a wireless vacuum gauge device 50. The wireless vacuum gauge device 50 includes a pressure sensor 51, a transmitter 52, a power feeder 53, and a casing 54.

The core 13 is a porous body that is formed of a material having low thermal conductivity. The core 13 serves as the framework of the vacuum insulator, and forms a thermally insulated space. For example, open-cell foam such as open-cell urethane foam, resin foam such as styrene foam, a mass of fibers, or a mass of inorganic fine particles is used as the core 13. The open-cell urethane foam is polyurethane foam with open cells, in which a plurality of cells communicate with one another.

The outer skin 14 is formed of a non-metal material, such as resin. The outer skin 14 has gas barrier capability, and keeps the pressure inside the vacuum insulator 10 low. For example, the outer skin 14 may have a layered structure that includes: a heat-sealable thermoplastic resin layer; an air barrier layer made of, for example, an ethylene-vinyl alcohol copolymer (EVOH) or polyvinyl alcohol polymer; and a water vapor barrier layer made of, for example, polypropylene. The outer skin 14 accommodates therein and covers the core 13 and the wireless vacuum gauge device 50. It should be noted that not only the core 13 and the wireless vacuum gauge device 50, but also a gas adsorbent may be accommodated inside the outer skin 14. The gas adsorbent adsorbs water vapor and gas, such as air, remaining in, or entering the inside of, the outer skin 14. This makes it possible to keep the pressure inside the outer skin 14 low.

The pressure sensor 51 is a sensor that detects the pressure (gas pressure) inside the outer skin 14. The pressure sensor 51 is electrically connected to the transmitter 52, and outputs the detected pressure to the transmitter 52. For example, the pressure sensor 51 includes a heater and a thermocouple. In this case, when the heater is heated, the thermocouple detects a temperature. Based on the detected temperature, the pressure sensor 51 measures the thermal conduction characteristics of the surroundings, thereby measuring the gas pressure (i.e., the degree of vacuum). However, the pressure sensor 51 is not limited to this example. As another example, a micro-electro-mechanical system (MEMS) of a piezoelectric element type, an electrostatic capacitance type, or a vibration type may be used as the pressure sensor 51.

The transmitter 52 is an element that transmits, by wireless communication, the detected pressure detected by the pressure sensor 51. For example, the transmitter 52 includes a communication control IC, a memory, and an antenna. The transmitter 52 stores its own identification information (i.e., transmitter ID) in the memory. The communication control IC transmits the transmitter ID together with the detected pressure from the antenna. For example, the transmitter 52 performs short-distance wireless communication that uses a 13.56 MHz band frequency, and transmits the detected pressure by NFC (Near Field Communication). Accordingly, the transmitter 52 can receive the detected pressure by being adjacent to a receiver that is positioned within a predetermined distance (e.g., within 10 cm) from the transmitter 52.

The power feeder 53 is electrically connected to the pressure sensor 51 and the transmitter 52, and feeds electric power to the pressure sensor 51 and the transmitter 52. For example, the power feeder 53 includes: a power feeding control IC; and a power receiver that receives electric power wirelessly by utilizing a magnetic resonance technique. The power receiver includes a secondary coil (a power receiving coil 55) that receives electric power in a non-contact manner from a primary coil (a power transmitting coil) positioned outside the outer skin 14. The power receiving coil 55 is a coil with a conductive wire that is wound around the center axis of the power receiving coil 55. The power receiving coil 55 is, for example, a solenoid coil or spiral coil. The power receiving coil 55 receives electric power transmitted from the power transmitting coil, and the power feeding control IC feeds the electric power to the pressure sensor 51 and the transmitter 52. As thus described, no battery is used for feeding electric power to the pressure sensor 51 and the transmitter 52. Therefore, there is no risk of battery leakage in a decompressed state. This makes it possible to prevent a situation where battery leakage causes lowering of the degree of vacuum of the vacuum insulator 10 and a situation where the power feeding cannot be performed due to battery leakage.

The casing 54 is formed of a non-metal material, such as resin. The casing 54 accommodates therein the pressure sensor 51, the transmitter 52, and the power feeder 53, and is disposed inside the outer skin 14. The casing 54 includes an interior space, and the casing 54 is provided with a plurality of through-holes 56. Air inside the casing 54 is discharged through the through-holes 56. Accordingly, inside the outer skin 14, the pressure inside the casing 54 and the pressure outside the casing 54 are equal to each other. In order to protect circuit components, the interior space of the casing 54 may be potted with resin. Also in this case, the pressure sensor 51 and the through-holes 56 are not buried in the resin, and the pressure inside the casing 54 detected by the pressure sensor 51 and the pressure outside the casing 54 are equal to each other.

For example, the casing 54 has a flat plate shape, and includes a pair of walls facing each other and four walls connecting these facing walls. One of the pair of walls (a fixed wall 57) is a flat wall to which the pressure sensor 51, the transmitter 52, and the power feeder 53 are mounted in such a manner that the pressure sensor 51, the transmitter 52, and the power feeder 53 are arranged side by side. For this reason, in a direction orthogonal to the arrangement direction of these components, the dimension between the pair of walls can be made small (i.e., the thickness of the casing 54 can be made small). Therefore, the thickness of the core 13, which is stacked on top of the casing 54 of the wireless vacuum gauge device 50, can be made great without causing increase in the thickness of the vacuum insulator 10. Therefore, deterioration in the thermal insulation performance due to the wireless vacuum gauge device 50 can be suppressed. It should be noted that the wireless vacuum gauge device 50 need not include a part of, or the entirety of, the casing 54. For example, in the wireless vacuum gauge device 50, circuit components that need to be protected are potted with resin, and thereby the circuit board is covered with the resin. In this manner, the casing 54 can be eliminated from the wireless vacuum gauge device 50, or the wireless vacuum gauge device 50 can use the casing 54 in which the pressure sensor 51, the transmitter 52, and the power feeder 53 are at least partly accommodated. This makes it possible to further reduce the thickness of the wireless vacuum gauge device 50.

The first vacuum insulator 10*a* is provided with a recess that is recessed from the lower surface of the core 13, and the wireless vacuum gauge device 50 (first wireless vacuum gauge device 50*a*) is disposed in the recess. The fixed wall 57 of the first wireless vacuum gauge device 50*a* and the lower surface of the core 13 are flush with each other, and covered by the outer skin 14. In this manner, the first wireless vacuum gauge device 50*a* is disposed in the first vacuum insulator 10*a*. The power receiving coil 55 is mounted to the fixed wall 57, such that the power receiving coil 55 faces parallel to the fixed wall 57, and such that the center axis of the power receiving coil 55 of the power feeder 53 extends in a direction orthogonal to the fixed wall 57. Accordingly, the power receiving coil 55 is disposed parallel to the lower surface of the first vacuum insulator 10*a*.

The second vacuum insulator 10*b* is provided with a recess that is recessed from the upper surface of the core 13, and the wireless vacuum gauge device 50 (second wireless vacuum gauge device 50*b*) is disposed in the recess. The fixed wall 57 of the second wireless vacuum gauge device 50*b* and the upper surface of the core 13 are flush with each other, and covered by the outer skin 14. In this manner, the second wireless vacuum gauge device 50*b* is disposed in the second vacuum insulator 10*b*. The power receiving coil 55 is mounted to the fixed wall 57, such that the power receiving coil 55 faces parallel to the fixed wall 57, and such that the center axis of the power receiving coil 55 of the power feeder 53 extends in a direction orthogonal to the fixed wall 57. Accordingly, the power receiving coil 55 is disposed parallel to the upper surface of the second vacuum insulator 10b.

<Method of Manufacturing First Vacuum Insulator>

Figure 4:
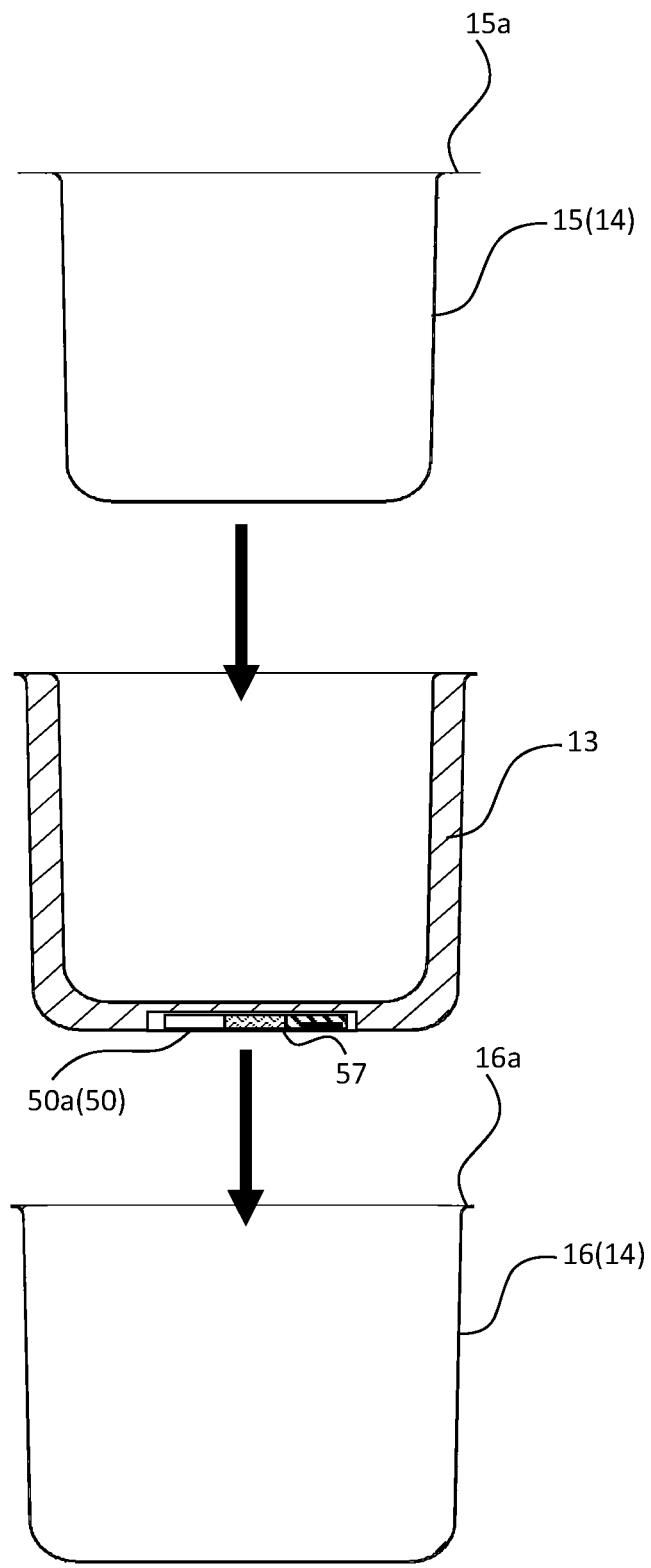
FIG. 4 is a sectional view schematically showing an inner member, a core, and an outer member of a first vacuum insulator shown in FIG. 1.

As shown in FIG. 4, the outer skin 14 of the first vacuum insulator 10a includes an inner member 15 and an outer member 16. Each of the inner member 15 and the outer member 16 is in the shape of a box whose upper end is open, and includes a flange 15a or 16a, which surrounds the periphery of the upper end opening. Each of the inner member 15 and the outer member 16 is formed in a predetermined shape, for example, by vacuum forming, pressure forming, or blow molding. The core 13 is formed by: injecting a urethane liquid into a mold; and after open-cell urethane foam is formed as a result of foaming of the urethane liquid, releasing the open-cell urethane foam from the mold. At the time, the recess that is recessed from the lower surface of the core 13 is also formed.

The first wireless vacuum gauge device 50a is fitted in the formed recess of the core 13, such that the fixed wall 57 of the first wireless vacuum gauge device 50a is exposed from the recess. Then, these components are accommodated inside the outer member 16, and the inner member 15 is accommodated inside the core 13. As a result, the core 13 and the first wireless vacuum gauge device 50a are accommodated in a thermally insulated space between the outer member 16 and the inner member 15, and the flange 15a of the inner member 15 is placed over the flange 16a of the outer member 16.

Figure 5:
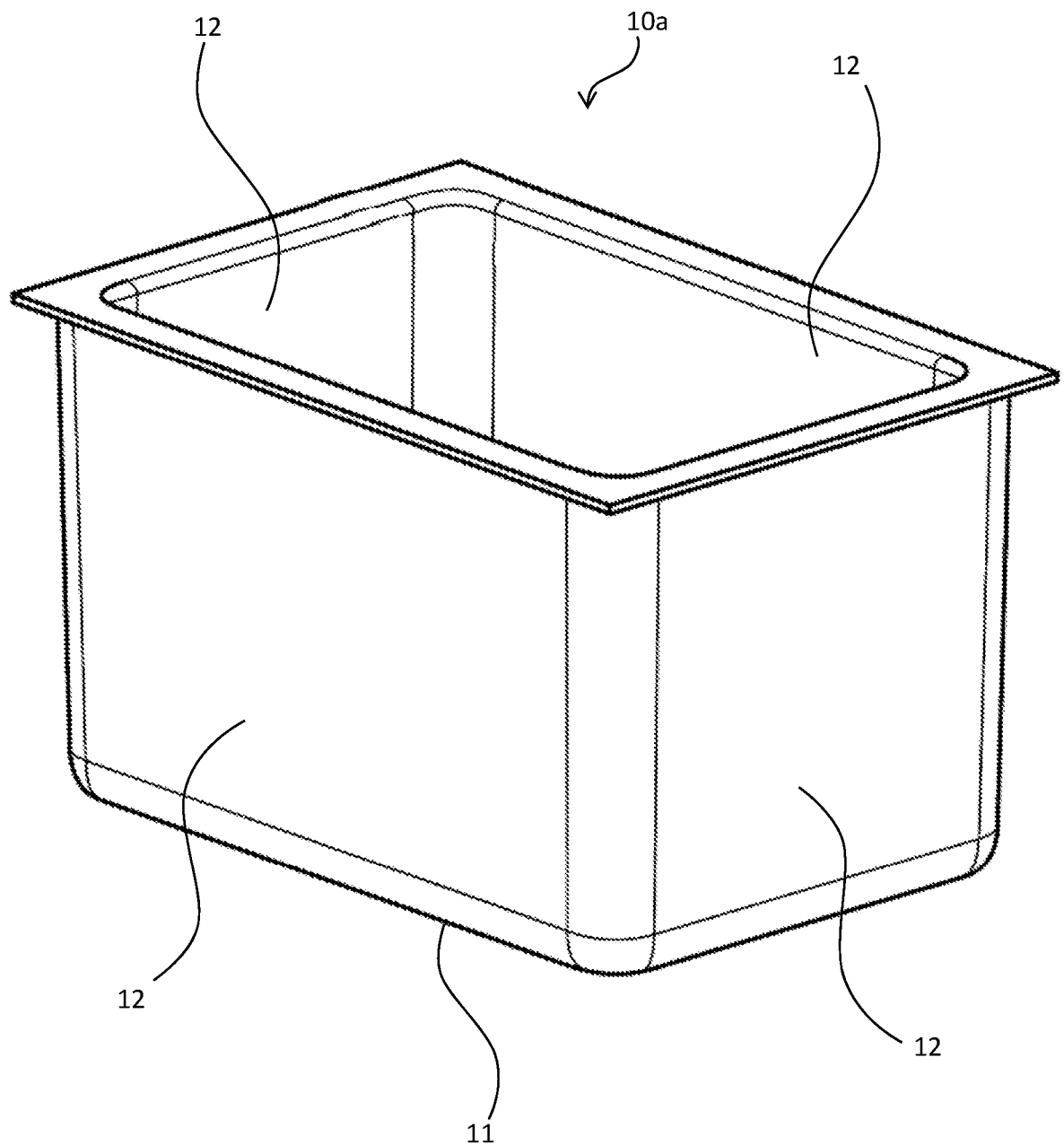
FIG. 5 is a perspective view showing the first vacuum insulator of FIG. 1.

The flange 16a and the flange 15a are fused together, and a vacuum is drawn on the thermally insulated space therebetween through an opening that is formed in either the inner member 15 or the outer member 16. As a result, the thermally insulated space is decompressed, which brings the inner member 15 and the outer member 16 into close contact with the core 13 and brings the outer member 16 into close contact with the fixed wall 57 of the first wireless vacuum gauge device 50a. Then, by sealing the opening with a sealing material, the outer skin 14 is sealed up. In this manner, the first vacuum insulator 10a shown in FIG. 5 is manufactured.

<Testing System for Testing Vacuum Insulator>

Figure 6:
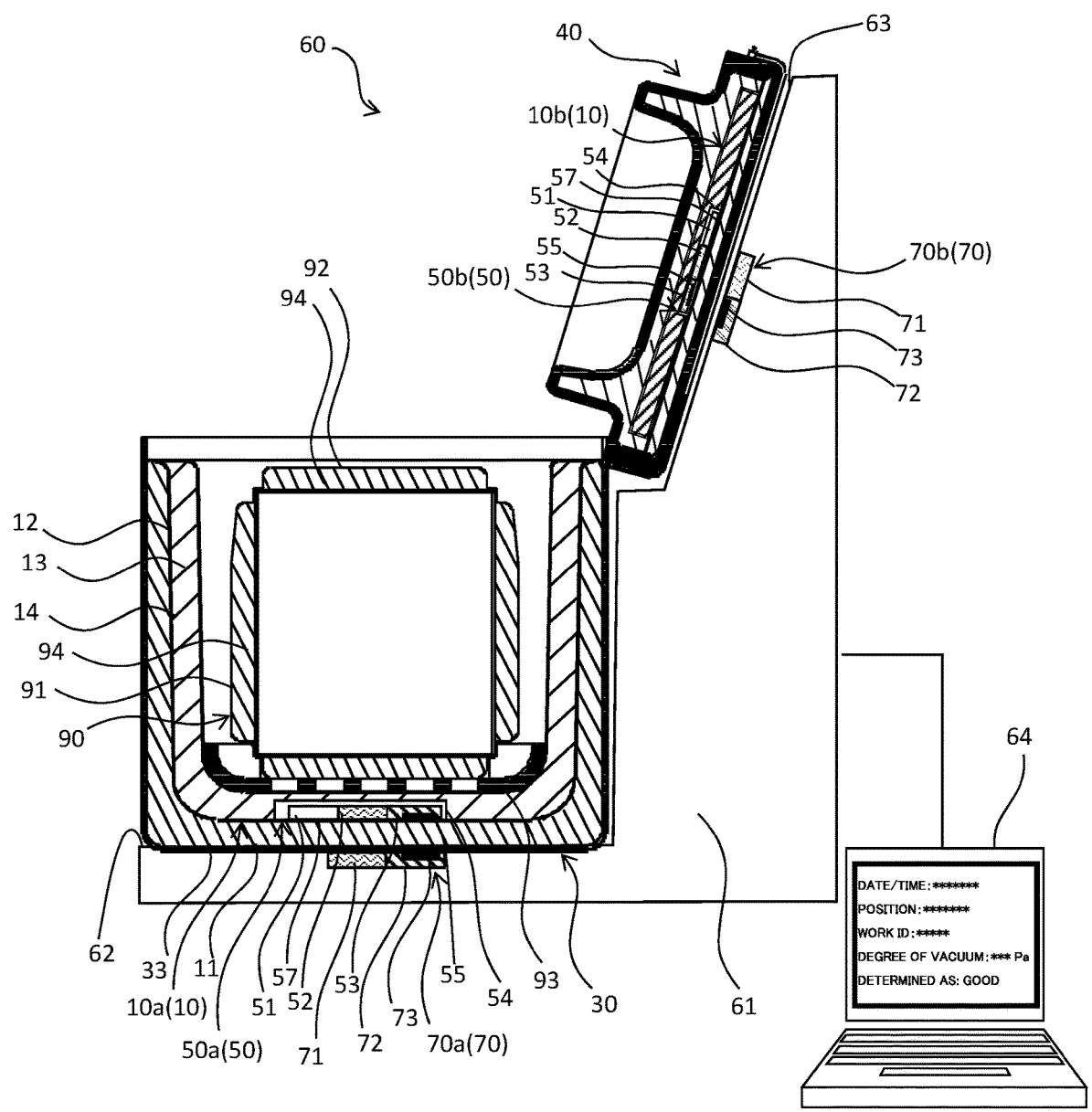
FIG. 6 shows a testing system for testing the vacuum insulators of FIG. 1.

As shown in FIG. 6, a testing system 60 for testing the vacuum insulators 10 includes the vacuum insulators 10, testers 70, and a base 61. Each tester 70 includes a receiver 71 and a power transmitter 72. Each tester 70 is disposed outside the outer skin 14 of a corresponding one of the vacuum insulators 10, and is connected to a computer 64. In a state where the vacuum insulators 10 are placed on the base 61, each tester 70 is disposed opposite to the wireless vacuum gauge device 50 of the corresponding vacuum insulator 10 such that, in a direction orthogonal to the fixed wall 57 of the wireless vacuum gauge device 50, the tester 70 overlaps at least part of the wireless vacuum gauge device 50.

Each of the testers 70a and 70b includes the receiver 71 and the power transmitter 72. The power transmitter 72 includes a power transmitting coil 73. The power transmitting coil 73 is a coil with a conductive wire that is wound around the center axis of the power transmitting coil 73. The power transmitting coil 73 is, for example, a solenoid coil or spiral coil. The receiver 71 of each tester 70 and the transmitter 52 of the corresponding wireless vacuum gauge device 50 constitute a wireless communication unit. The power transmitter 72 of each tester 70 and the power feeder 53 of the corresponding wireless vacuum gauge device 50 constitute a wireless power feeding unit.

The testers 70 are the first tester 70a and the second tester 70b. The first tester 70a tests the degree of vacuum of the first vacuum insulator 10a, and the second tester 70b tests the degree of vacuum of the second vacuum insulator 10b. The base 61 includes, for example, a first placement surface 62, on which the heat retention container 30 is placed, and a second placement surface 63, on which the heat retention lid 40 is placed.

For example, the first placement surface 62 is disposed horizontally, and faces the lower surface of the heat retention container 30 placed thereon. The second placement surface 63 is disposed so as to be inclined relative to the first placement surface 62, such that the second placement surface 63 faces the upper surface of the heat retention lid 40 in a state where the upper end opening of the heat retention container 30 placed on the first placement surface 62 is opened. The first tester 70a is disposed in the first placement surface 62 such that, in a state where the heat retention container 30 is placed on the first placement surface 62, the first wireless vacuum gauge device 50a is positioned opposite to the first tester 70a. The second tester 70b is disposed in the second placement surface 63 such that, in a state where the heat retention lid 40 is placed on the second placement surface 63, the second wireless vacuum gauge device 50b is positioned opposite to the second tester 70b. Accordingly, without changing the arrangement of the heat retention box 20, the degree of vacuum of the first vacuum insulator 10a and the degree of vacuum of the second vacuum insulator 10b can be readily tested by the first tester 70a and the second tester 70b, respectively.

The first placement surface 62 is provided with a recess, and the first tester 70a is accommodated in the recess. The second placement surface 63 is also provided with a recess, and the second tester 70b is accommodated in the recess. When the heat retention container 30 is placed on the first placement surface 62, the fixed wall 57 of the first tester 70a is disposed parallel to the first placement surface 62. When the heat retention lid 40 is placed on the second placement surface 63, the fixed wall 57 of the second tester 70b is disposed parallel to the second placement surface 63. In each of the testers 70a and 70b, the receiver 71 is disposed opposite to the transmitter 52 such that, in a direction orthogonal to the fixed wall 57, the receiver 71 overlaps at least part of the transmitter 52, and the power transmitting coil 73 of the power transmitter 72 is disposed opposite to the power receiving coil 55 of the power feeder 53 such that, in the direction orthogonal to the fixed wall 57, the power transmitting coil 73 overlaps at least part of the power receiving coil 55.

The receiver 71 includes a communication control IC, a memory, and an antenna. The receiver 71 stores its own identification information (i.e., receiver ID) in the memory. The communication control IC outputs the receiver ID together with received information to the computer 64. The computer 64 includes: an operational processing unit such as a CPU; a storage unit including a RAM and ROM; and a display unit such as a screen. The computer 64 displays the information on the display unit, and stores the information in the storage unit. The computer 64 also controls the driving of the power transmitter 72.

In the case of testing each vacuum insulator 10 by the testing system 60, the heat retention box 20 is placed on the first placement surface 62, and the heat retention lid 40 is opened. As a result, the receiver 71 is positioned opposite to the transmitter 52, and the power receiving coil 55 of the power feeder 53 is positioned opposite to the power transmitting coil 73 of the power transmitter 72. In this state, the computer 64 applies alternating current to the power transmitting coil 73. As a result, a magnetic field is generated. The power receiving coil 55 resonates at the same frequency as that of the vibration of the magnetic field, and electric power is transmitted from the power transmitting coil 73 to the power receiving coil 55.

At the time, the power receiving coil 55 and the power transmitting coil 73 are positioned opposite to each other, with other components positioned therebetween, such as the non-metal outer skin 14, the second lower wall 11, and the first lower wall 33. Since no metal is present between these components, the power receiving coil 55 can efficiently and safely receive the electric power while suppressing, for example, power loss due to eddy current as well as abnormal heating.

Since the power reception is performed by utilizing the magnetic resonance technique, each power receiving coil 55 can receive electric power from the corresponding power transmitting coil 73, which is several centimeters away from the power receiving coil 55. Therefore, in a state where the vacuum insulators 10 are covered by the protective layers 32 and 42 and the exterior members 31 and 41, the power receiving coils 55 can receive the electric power from the power transmitting coils 73. This makes it possible to readily test the degrees of vacuum of the respective vacuum insulators 10 without removing the protective layers 32 and 42 and the exterior members 31 and 41 from the vacuum insulators 10.

Further, each power transmitting coil 73 is mounted in parallel to the surface of the tester 70a exposed from the recess of the placing surface 62 or in parallel to the surface of the tester 70b exposed from the recess of the placing surface 63, such that the center axis of the power transmitting coil 73 is orthogonal to the exposed surface. Also, each power receiving coil 55 is mounted in parallel to the fixed wall 57 of the corresponding casing 54. In this manner, the power transmitting coils 73 and the power receiving coils 55 can be positioned parallel to each other and closely opposite to each other. With this arrangement, lowering of power feeding efficiency due to inclination can be reduced, which allows each power receiving coil 55 to receive electric power efficiently.

Each power feeder 53 feeds the electric power received by its power receiving coil 55 to the pressure sensor 51 and the transmitter 52. That is, each time the test is performed, the power feeders 53 receive electric power. Therefore, unlike batteries, the power feeders 53 do not fall into a power shortage state, and this makes it possible to perform the tests on the vacuum insulators 10 for a long term.

Then, each pressure sensor 51 detects the pressure of the corresponding vacuum insulator 10, and outputs the detected pressure to the transmitter 52. The transmitter 52 transmits the detected pressure and its own transmitter ID to the corresponding receiver 71. The receiver 71 receives the detected pressure and the transmitter ID, and outputs its own receiver ID together with the received information to the computer 64.

At the time, the receiver 71 communicates with the transmitter 52 via, for example, the non-metal outer skin 14. This makes it possible to reduce lowering of the communication efficiency due to the outer skin 14 and to receive the detected pressure from the transmitter 52 within a short period of time. Since NFC is used for the communication between the receiver 71 and the transmitter 52, pairing between the transmitter 52 and the receiver 71 is unnecessary, which allows the receiver 71 to quickly receive the detected pressure.

Subsequently, the computer 64 stores the detected pressure, the transmitter ID, and the receiver ID in association with each other in the storage unit, and displays these pieces of information on the display unit. Since each transmitter 52 has a one-to-one correspondence with the corresponding vacuum insulator 10, the vacuum insulator 10 can be identified based on the transmitter ID. Also, the degree of vacuum of the vacuum insulator 10 can be determined based on the detected pressure. In addition, since each receiver 71 has a one-to-one correspondence with the corresponding tester 70, the tester 70 can be identified based on the receiver ID. Thus, the degree of vacuum of each vacuum insulator 10 and the position where the vacuum insulator 10 has been tested can be managed based on the detected pressure, the transmitter ID, and the receiver ID.

As described above, since each vacuum insulator 10 includes the wireless vacuum gauge device 50, the degree of vacuum (i.e., thermal insulation performance) of the vacuum insulator 10 can be measured in a non-contact manner. Therefore, damage to the vacuum insulator 10, the damage being caused by bringing testing equipment such as a heat flux sensor and a temperature sensor into contact with the vacuum insulator 10, can be reduced. Moreover, by using the pressure sensor 51, the degree of vacuum of the vacuum insulator 10 can be measured within a shorter period of time (e.g., within one second) than a testing time (e.g., several minutes to several tens of minutes) that is necessary in the case of using such testing equipment as a heat flux sensor.

<Variation 1>

In the above-described embodiment, the transmitter 52 transmits the detected pressure by NFC. However, the transmission method is not limited to NFC. Other short-distance wireless communication techniques can be used. For example, the transmitter 52 may transmit the detected pressure by BLE (Bluetooth (registered trademark) low energy) communication. In this case, for example, radio waves in the 2.4 GHz frequency band are used. By using BLE communication for the communication between the transmitter 52 and the receiver 71, the receiver 71 can receive the detected pressure from the transmitter 52 even if the transmitter 52 is disposed at a distant position. Therefore, in this case, the installation position of the receiver 71 is not limited to a position corresponding to the position of the transmitter 52. That is, the degree of freedom in terms of the installation position of the receiver 71 can be increased.

It should be noted that the transmitter 52 of the first vacuum insulator 10a and the transmitter 52 of the second vacuum insulator 10b may use the same communication technique, or may use different communication techniques from each other. For example, either one of the transmitter 52 of the first vacuum insulator 10a or the transmitter 52 of the second vacuum insulator 10b may use the NFC technique, and the other transmitter 52 may use the BLE communication technique.

<Variation 2>

In the above-described embodiment, the power receiving coil 55 of the power feeder 53 receives electric power by the magnetic resonance technique. However, the power reception can be performed not only by the magnetic resonance technique, but also by other wireless power feeding techniques. For example, the power receiving coil 55 may receive electric power by using an electromagnetic induction technique. In this case, the power transmitting coil 73 and the power receiving coil 55 are brought close to each other, and in this state, alternating current is applied to the power transmitting coil 73. Consequently, a magnetic flux is generated, and due to variation in the magnetic flux, induced electromotive force is generated in the power receiving coil 55. The power feeder 53 adopting such an electromagnetic induction technique can be made compact, which makes it possible to suppress deterioration in the thermal insulation performance while avoiding increase in the size of the vacuum insulator 10.

It should be noted that the power feeder 53 of the first vacuum insulator 10a and the power feeder 53 of the second vacuum insulator 10b may use the same wireless power feeding technique, or may use different wireless power feeding techniques from each other. For example, either one of the power feeder 53 of the first vacuum insulator 10a or the power feeder 53 of the second vacuum insulator 10b may use the magnetic resonance technique, and the other power feeder 53 may use the electromagnetic induction technique.

<Variation 3>

In the above-described embodiment, the power feeder 53 performs the power feeding by using the wireless power feeding technique. However, the power feeding method is not limited to wireless power feeding. For example, the power feeder 53 may include a battery that stores electric power to be fed to the pressure sensor 51 and the transmitter 52. The power feeder 53 including such a battery can be made compact, which makes it possible to suppress deterioration in the thermal insulation performance while avoiding increase in the size of the vacuum insulator 10.

A battery in which no liquid electrolyte is used may be used in the power feeder 53. For example, an all-solid-state battery, such as an all-solid-state lithium ion battery, may be used. In this case, even when the inside of the outer skin 14 is decompressed, no battery leakage occurs. This makes it possible to prevent a situation where battery leakage causes lowering of the degree of vacuum of the vacuum insulator 10 and a situation where the power feeding cannot be performed due to battery leakage.

In a case where the battery is used in the vacuum insulator 10, the tester 70 for testing the vacuum insulator 10 includes the receiver 71 receiving the detected pressure transmitted from the transmitter 52, but does not include the power transmitter 72 transmitting electric power to the power feeder 53. This makes it possible to reduce the size of the tester 70 and the size of the testing system 60 including the tester 70, and lower the costs.

<Variation 4>

In the above-described embodiment, the degrees of vacuum of the respective vacuum insulators 10 are tested in a state where the vacuum insulators 10 are covered by the exterior members 31 and 41 and the protective layers 32 and 42. However, the testing method is not thus limited. The degrees of vacuum of the respective vacuum insulators 10 may be tested in a state where the exterior members 31 and 41 and the protective layers 32 and 42 are removed from the vacuum insulators 10.

Figure 7:
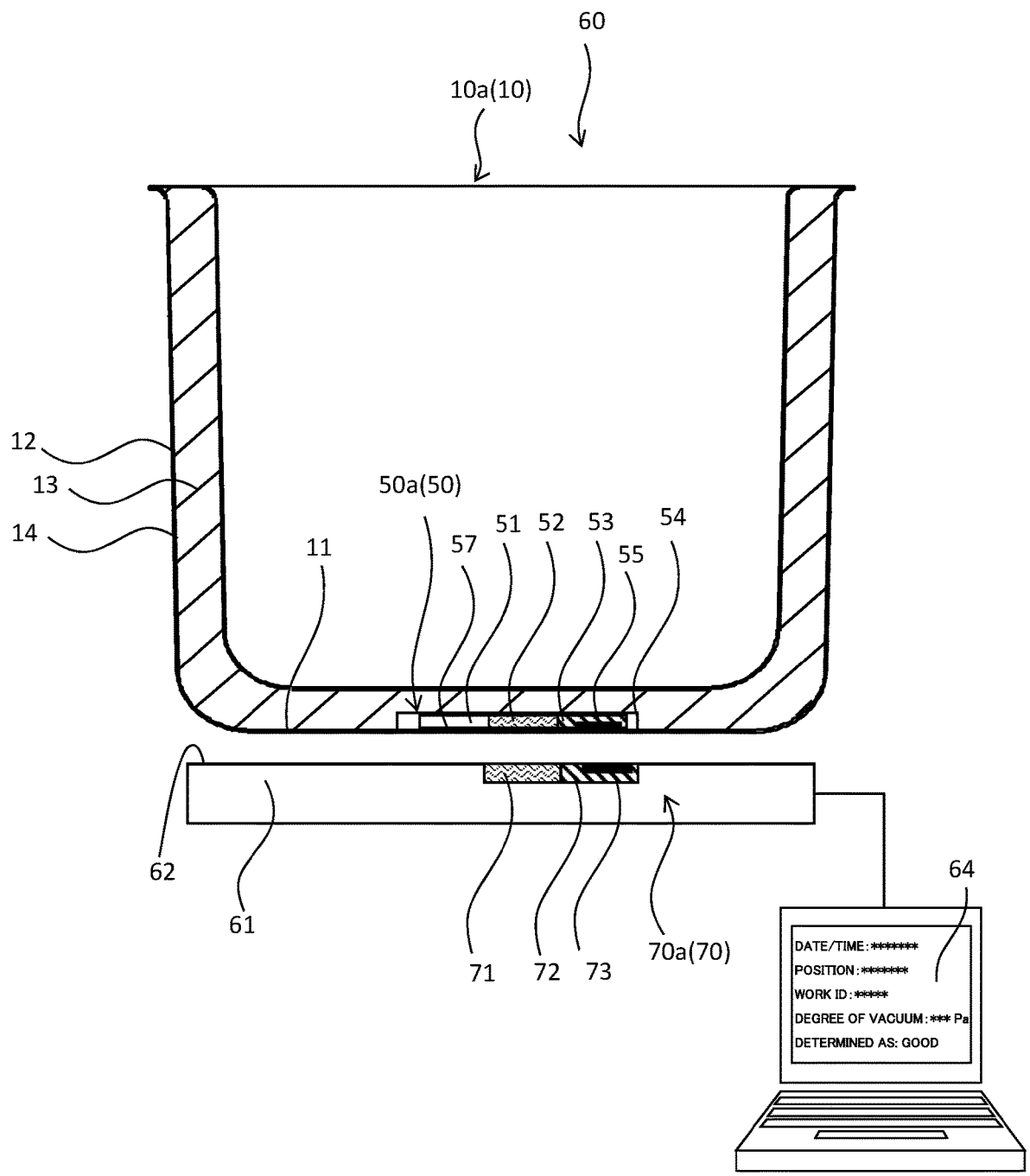
FIG. 7 shows a testing system for testing the vacuum insulator according to Variation 4 of Embodiment 1 of the present disclosure.

For example, as shown in FIG. 7, the first vacuum insulator 10a is placed on the first placement surface 62 without the first exterior member 31 and the first protective layer 32 being present between the first vacuum insulator 10a and the first placement surface 62. As a result, the receiver 71 is positioned opposite to the transmitter 52, with the outer skin 14 of the first vacuum insulator 10a being present between the receiver 71 and the transmitter 52, and the power receiving coil 55 of the power feeder 53 is positioned opposite to the power transmitting coil 73 of the power transmitter 72 with the outer skin 14 of the first vacuum insulator 10a being present between the power receiving coil 55 and the power transmitting coil 73. Accordingly, the distance between the receiver 71 and the transmitter 52, and the distance between the power receiving coil 55 and the power transmitting coil 73, can be reduced. Consequently, the receiver 71 can receive the detected pressure from the transmitter 52 more assuredly, and the power receiving coil 55 can receive the electric power from the power transmitting coil 73 more efficiently. This makes it possible to reduce the testing time.

Embodiment 2

<Configuration of Testing System for Testing Vacuum Insulator>

Figure 8:
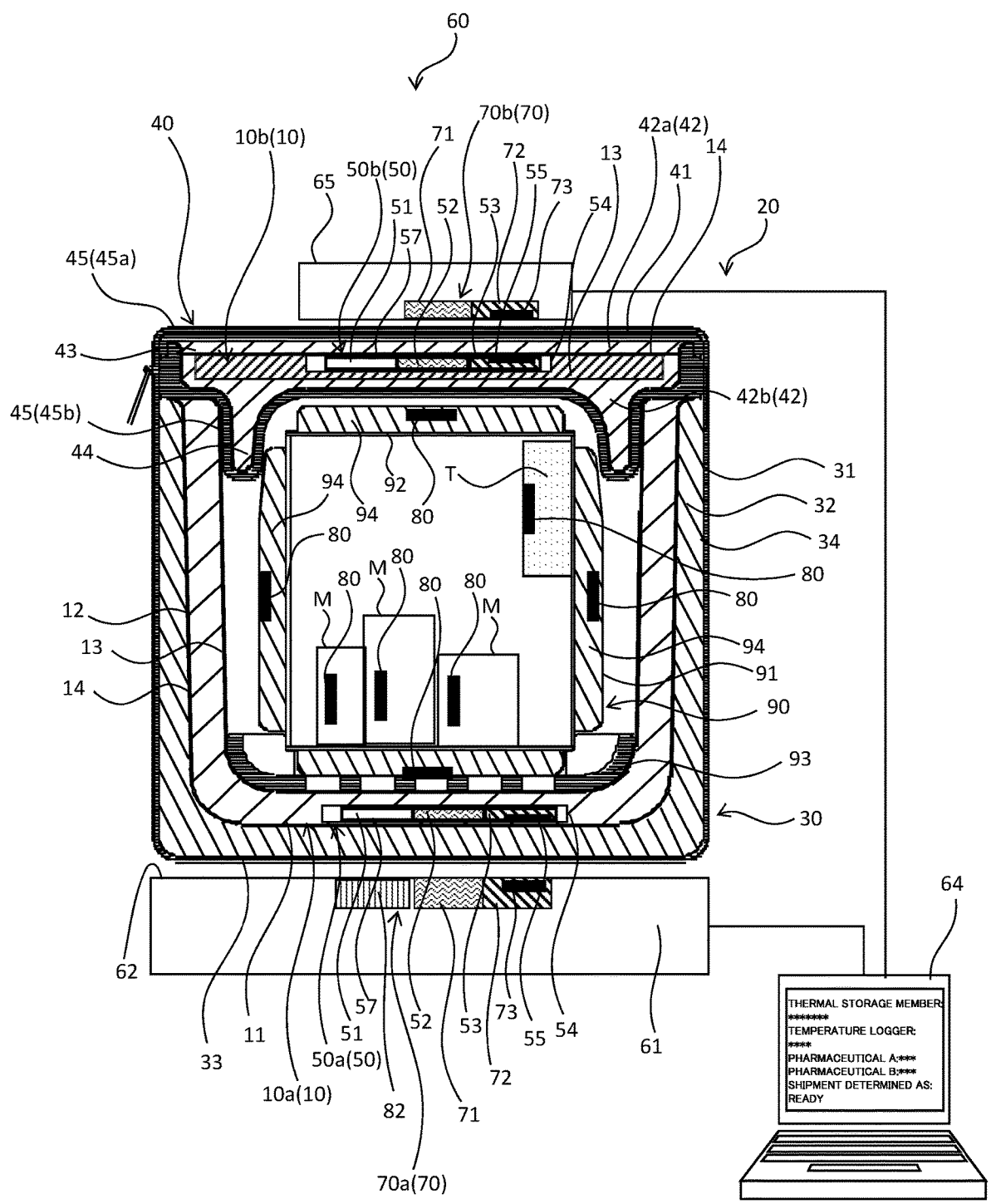
FIG. 8 shows a testing system for testing the vacuum insulators according to Embodiment 2 of the present disclosure.

As shown in FIG. 8, the testing system 60 for testing the vacuum insulators 10 according to Embodiment 2 further includes ID tags 80 and an ID reader 82 in addition to the vacuum insulators 10, the testers 70, and the base 61. With this configuration, the testing system 60 is capable of not only testing the thermal insulation performance of the vacuum insulators 10, but also testing accommodated articles in the heat retention box 20.

Figure 9:
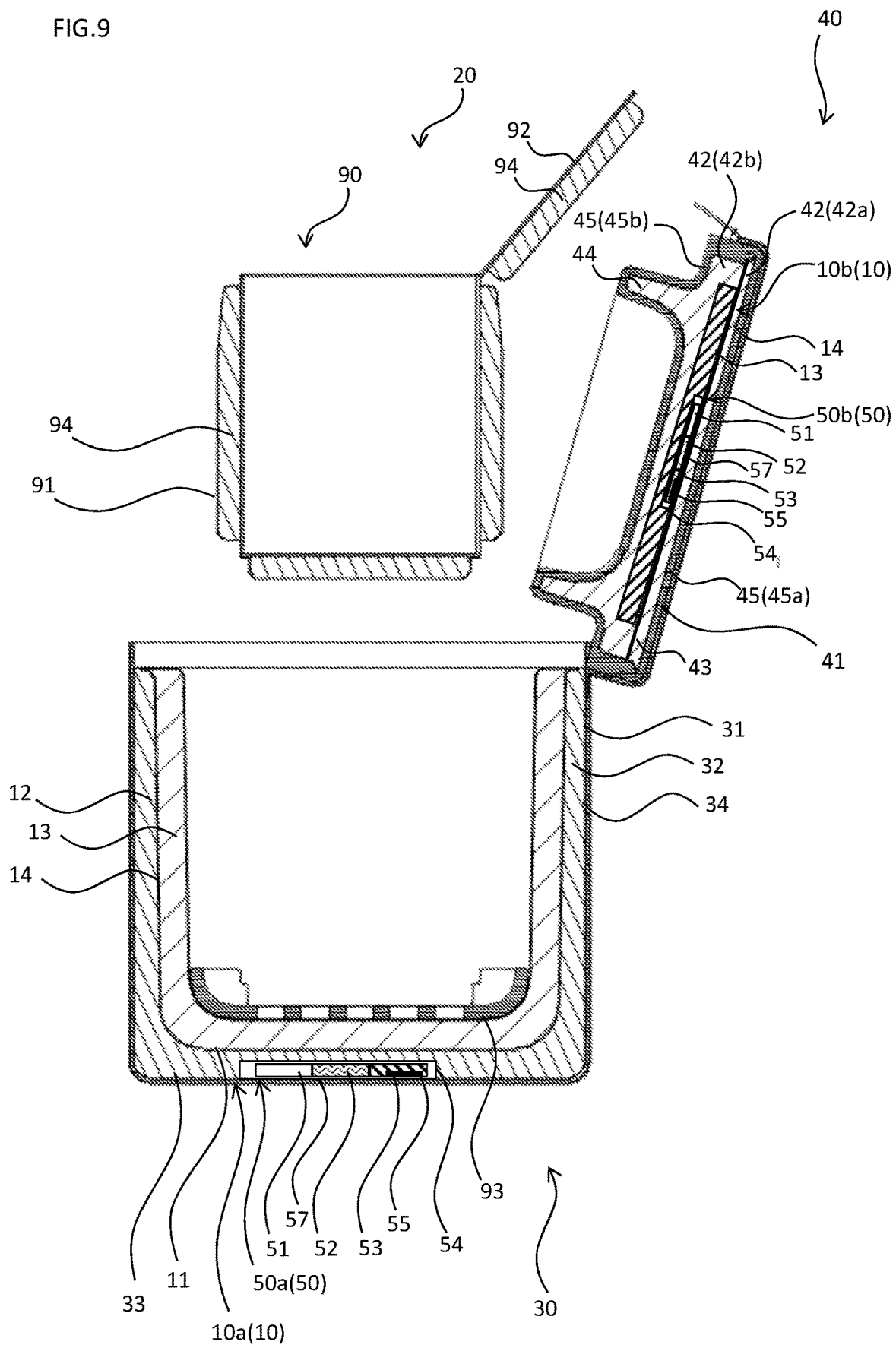
FIG. 9 is a sectional view schematically showing a heat retention box and a thermal storage container whose heat retention lid and thermal storage lid shown in FIG. 8 are opened.

Specifically, the heat retention box 20 includes the heat retention container 30, the heat retention lid 40, and a thermal storage unit 90. As shown in FIG. 9, the thermal storage unit 90 includes a thermal storage container 91, a thermal storage lid 92, and a support 93. The thermal storage container 91 is in the shape of a box whose upper end is open. The thermal storage lid 92 is attached to the upper end of the thermal storage container 91 in such a manner that the upper end opening of the thermal storage container 91 is openable and closeable. This makes it possible to prevent a situation where the thermal storage container 91 is put into the heat retention box 20, with no thermal storage lid 92 attached to the thermal storage container 91.

The thermal storage container 91 and the thermal storage lid 92 are provided with accommodating portions along their surfaces. Thermal storage members 94 are accommodated in the respective accommodating portions in an attachable/detachable manner. The thermal storage members 94 have cooling capability or heat retention capability. The thermal storage members 94 surround an interior space formed by the thermal storage container 91 and the thermal storage lid 92, and can cool or retain the heat of the interior space. A temperature logger T is installed inside the thermal storage container 91.

The support 93 is formed of, for example, a cushioning material such as styrene foam. The support 93 has a shape extending along the upper surface of the second lower wall 11 of the first vacuum insulator 10a. As shown in FIG. 1, the thermal storage unit 90 is put in the interior space of the heat retention box 20, the interior space being formed by the heat retention container 30 and the heat retention lid 40. The support 93 is disposed on the second lower wall 11 of the first vacuum insulator 10a, and supports the thermal storage container 91 in relation to the first vacuum insulator 10a. In a state where the heat retention container 30 accommodating the thermal storage unit 90 therein is sealed by the heat retention lid 40, the protruding portion of the lower lid part 44 of the heat retention lid 40 fits between the first vacuum insulator 10a and the thermal storage container 91, and the thermal storage container 91 is supported in relation to the heat retention container 30.

The ID tags 80 are attached to the respective accommodated articles inside the vacuum insulators 10, such as the thermal storage members 94, the support 93, the temperature logger T, and articles M. Each ID tag 80 is, for example, a passive IC tag, such as a RFID (radio frequency identifier) tag. Each ID tag 80 includes a memory, and stores identification information about the corresponding accommodated article (accommodated article ID) in the memory. The ID reader 82 is, for example, a RFID reader including an antenna. The ID reader 82 is provided in the base 61, such that the ID reader 82 is side by side with the first tester 70a. The ID reader 82 is connected to the computer 64.

<Testing Method Performed by Testing System>

Described hereinafter is a case where, as shown in FIG. 8, the degrees of vacuum of the respective vacuum insulators 10 are tested by the testing system 60, and also, the accommodated articles inside the vacuum insulators 10 are tested by the testing system 60. In the case described below, the first tester 70a is disposed in the base 61, and the second tester 70b is included in a terminal 65, which is a portable terminal separated from the base 61. However, the configuration of the second tester 70b is not thus limited. For example, as shown in FIG. 6, both the first tester 70a and the second tester 70b may be provided in the base 61.

First, for example, the thermal storage members 94 cooled and kept to several degrees Celsius in advance are accommodated in the accommodating portions of the thermal storage container 91 and the accommodating portion of the thermal storage lid 92. The temperature logger T is installed in the thermal storage container 91. The articles M are accommodated in the thermal storage container 91, and the opening of the thermal storage container 91 is closed by the thermal storage lid 92. Then, the thermal storage unit 90 is accommodated in the heat retention container 30, and the opening of the heat retention container 30 is closed by the heat retention lid 40.

Thereafter, the heat retention box 20 is placed on the first placement surface 62, such that the first wireless vacuum gauge device 50a is positioned opposite to the first tester 70a. Also, the terminal 65 is placed on the heat retention lid 40, such that the second wireless vacuum gauge device 50b is positioned opposite to the second tester 70b. As a result, each transmitter 52 is positioned opposite to the corresponding receiver 71, and the power receiving coil 55 of each power feeder 53 is positioned opposite to the power transmitting coil 73 of the corresponding power transmitter 72.

In this state, when the computer 64 applies alternating current to the power transmitter 72 of each tester 70, the power transmitting coil 73 of the tester 70 transmits electric power to the power receiving coil 55. The power feeder 53 feeds the electric power received by the power receiving coil 55 to the pressure sensor 51 and the transmitter 52. The pressure sensor 51 detects the pressure of the vacuum insulator 10, and outputs the detected pressure to the transmitter 52. The transmitter 52 transmits the detected pressure and its own transmitter ID. Accordingly, the receiver 71 receives the detected pressure and the transmitter ID, and outputs its own receiver ID together with the received information to the computer 64.

The computer 64 drives the ID reader 82 to transmit radio waves from the ID reader 82. Upon receiving the radio waves from the ID reader 82, the ID tags 80 transmit the accommodated article IDs corresponding to the respective ID tags 80. The ID reader 82 receives the accommodated article IDs, and outputs them to the computer 64.

The computer 64 stores the accommodated article IDs in the storage unit together with and in association with the detected pressures, the transmitter IDs, and the receiver IDs, and displays these pieces of information on the display unit. Accordingly, the degrees of vacuum of the respective vacuum insulators 10 and the positions where the respective vacuum insulators 10 have been tested can be obtained based on the detected pressures, the transmitter IDs, and the receiver IDs. Also, the vacuum insulators 10 as well as the presence or absence of the accommodated articles therein, such as the thermal storage members 94, the support 93, the temperature logger T, and the articles M, can be determined based on the transmitter IDs and the accommodated article IDs. Accordingly, list data in which the vacuum insulators 10 and the articles to be accommodated therein are associated with each other may be prepared in advance, and if the accommodated article IDs of all the articles listed in the list data are obtained, it can be determined that all the articles to be accommodated have been accommodated inside the vacuum insulators 10 and that the shipment is ready. In this manner, article management can be performed for the vacuum insulators 10 and the articles accommodated therein.

<Other Variations>

In all of the above-described embodiments and variations, the outer skin 14 is formed of a non-metal material. However, as an alternative, part of the outer skin 14 may be formed of a metal, such as aluminum or stainless steel. For example, of the outer skin 14, a region that is positioned opposite to at least one of the power receiving coil 55 and the transmitter 52 may be formed of a non-metal material, and the other region may be partly or entirely formed of a metal, such as metal foil. Accordingly, the power receiving coil 55 can receive electric power from the power transmitting coil 73 via the non-metal outer skin 14, and the transmitter 52 can communicate with the receiver 71 via the non-metal outer skin 14, whereas the other metal foil region can serve to keep the degree of vacuum inside the outer skin 14 high.

Alternatively, the outer skin 14 may have a structure in which a non-metal film and a metal vapor-deposited film are layered. In this case, since the metal vapor-deposited film is interposed between the power receiving coil 55 and the power transmitting coil 73, power feeding efficiency is lowered to some extent. However, the degree of vacuum inside the outer skin 14 can be kept high. It should be noted that, also in this case, the metal vapor-deposited film may not be formed on a region of the outer skin 14, the region being positioned opposite to at least one of the power receiving coil 55 and the transmitter 52, and the metal vapor-deposited film may be formed on part of or the entirety of the other region.

In all of the above-described embodiments and variations, the vacuum insulators 10 are covered by the exterior members 31 and 41 and the protective layers 32 and 42. However, the vacuum insulators 10 need not be covered by the exterior members 31 and 41 and the protective layers 32 and 42, or the vacuum insulators 10 may be covered by either the exterior members 31 and 41 or the protective layers 32 and 42.

In all of the above-described embodiments and variations, the power transmitter 72 and the receiver 71 are arranged side by side. However, the arrangement of these components is not thus limited. For example, the shorter the distance between the power transmitting coil 73 of the power transmitter 72 and the power receiving coil 55 of the power feeder 53, the higher the power transmission efficiency. Therefore, it is preferable that the power transmitter 72 be disposed such that the position of the power transmitting coil 73 and the position of the power receiving coil 55 correspond to each other. In this respect, in the case of using BLE for the communication performed by the transmitter 52 and the receiver 71, the receiver 71 can communicate with the transmitter 52 even if the transmitter 52 is disposed at a distant position. Therefore, in this case, the power transmitter 72 may be disposed such that the position of the power transmitting coil 73 corresponds to the position of the power receiving coil 55, and the receiver 71 may be disposed away from the position corresponding to the position of the transmitter 52.

It should be noted that any of the above-described embodiments may be combined with each other, so long as the combined embodiments do not contradict with each other. For example, Variation 1 may be applied to any of Embodiment 2 and Variations 2 to 3. Variation 2 may be applied to Embodiment 2 and Variation 4. Variation 3 may be applied to Embodiment 2 and Variation 4. Variation 4 may be applied to Embodiment 2.

From the foregoing description, numerous modifications and other embodiments of the present disclosure are obvious to a person skilled in the art. Therefore, the foregoing description should be interpreted only as an example, and is provided for the purpose of teaching the best mode for carrying out the present disclosure to a person skilled in the art. The structural and/or functional details may be substantially modified without departing from the spirit of the present disclosure.

INDUSTRIAL APPLICABILITY

The vacuum insulator and the system for testing the same according to the present disclosure are useful as, for example, a vacuum insulator and a system for testing the same that make it possible to test thermal insulation performance safely within a short period of time.

REFERENCE SIGNS LIST

10: vacuum insulator
10a: first vacuum insulator (vacuum insulator)
10b: second vacuum insulator (vacuum insulator)
13: core
14: outer skin
51: pressure sensor
52: transmitter
53: power feeder
55: power receiving coil
60: testing system
70: tester
70a: first tester (tester)
70b: second tester (tester)
71: receiver
72: power transmitter
73: power transmitting coil

The invention claimed is:

1. A vacuum insulator comprising:
an outer skin formed of a non-metal material;
a core;
a pressure sensor that detects a pressure; and
a transmitter that transmits, by wireless communication, the detected pressure detected by the pressure sensor, wherein
the vacuum insulator is in a shape of a box, and includes a lower wall and four side walls,
the outer skin comprises:
an inner member that is in a shape of a box whose upper end is open; and
an outer member that is in a shape of a box whose upper end is open,
the inner member and the outer member are combined together to form a communication space in which an interior space of the lower wall between the inner member and the outer member and interior spaces of the respective four side walls between the inner member and the outer member communicate with each other,
the core is provided in the communication space, and
the transmitter is provided in a part of the communication space, the part corresponding to none of the four side walls but to the lower wall.

2. The vacuum insulator according to claim 1, further comprising a power feeder that feeds electric power to the pressure sensor and the transmitter.

3. The vacuum insulator according to claim 2, wherein
the power feeder includes a power receiving coil that receives electric power transmitted from an external power transmitting coil, and
the power feeder feeds the electric power received from the power transmitting coil to the pressure sensor and the transmitter.

4. The vacuum insulator according to claim 1, further comprising a wireless vacuum gauge device provided on the lower wall, the wireless vacuum gauge device including at least the pressure sensor and the transmitter.

5. The vacuum insulator according to claim 4, wherein
the wireless vacuum gauge device further includes a power feeder that feeds electric power to the pressure sensor and the transmitter.

6. The vacuum insulator according to claim 5, wherein
the power feeder includes a power receiving coil that receives electric power transmitted from an external power transmitting coil, and
the power feeder feeds the electric power received from the power transmitting coil to the pressure sensor and the transmitter.

7. The vacuum insulator according to claim 1, wherein
the vacuum insulator is placed on a tester, and
the transmitter transmits the detected pressure to a receiver of the tester.

8. The vacuum insulator according to claim 7, wherein
the vacuum insulator is placed on the tester in a state where the vacuum insulator is covered by at least an exterior member.

9. The vacuum insulator according to claim 1, wherein
the transmitter transmits the detected pressure by NFC (Near Field Communication).

10. The vacuum insulator according to claim 1, wherein
the transmitter transmits the detected pressure by BLE (Bluetooth low energy) communication.

11. A testing system comprising:
a vacuum insulator; and
a tester on which the vacuum insulator is placed, wherein
the vacuum insulator includes:
an outer skin formed of a non-metal material;
a core;
a pressure sensor that detects a pressure;
a transmitter that transmits, by wireless communication, the detected pressure detected by the pressure sensor; and
a power receiving coil that receives, from outside, electric power that is fed to the pressure sensor and the transmitter,
the vacuum insulator is in a shape of a box, and includes a lower wall and four side walls, the outer skin includes:
an inner member that is in a shape of a box whose upper end is open; and
an outer member that is in a shape of a box whose upper end is open,
the inner member and the outer member are combined together to form a communication space in which an interior space of the lower wall between the inner member and the outer member and interior spaces of the respective four side walls between the inner member and the outer member communicate with each other,
the core is provided in the communication space,
the pressure sensor, the transmitter, and the power receiving coil are provided in a part of the communication space, the part corresponding to none of the four side walls but to the lower wall, and
the tester includes:
a receiver that receives the detected pressure transmitted from the transmitter; and
a power transmitting coil that transmits electric power to the power receiving coil.

12. The testing system according to claim 11, wherein
the vacuum insulator is placed on the tester in a state where the vacuum insulator is covered by at least an exterior member.

13. The testing system according to claim 11, wherein
the transmitter transmits the detected pressure by NFC (Near Field Communication).

14. The testing system according to claim 11, wherein
the transmitter transmits the detected pressure by BLE (Bluetooth low energy) communication.

* * * * *